United States Patent
Kitahori et al.

(10) Patent No.: US 6,900,956 B2
(45) Date of Patent: May 31, 2005

(54) DISK DEVICE AND DATA-ERASING METHOD

(75) Inventors: Hiroki Kitahori, Fujisawaa (JP); Kenji Kuroki, Fujisawa (JP); Hiroshi Matsuda, Zama (JP); Satoshi Noguchi, Fujisawa (JP); Mutsuro Ohta, Yokohama (JP); Keishi Takahashi, Fujisawa (JP); Hitoshi Tamura, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 426 days.

(21) Appl. No.: 09/825,649

(22) Filed: Apr. 4, 2001

(65) Prior Publication Data

US 2002/0021521 A1 Feb. 21, 2002

(30) Foreign Application Priority Data

Apr. 26, 2000 (JP) ........................................ 2000-126708

(51) Int. Cl.⁷ .............................. G11B 5/03; G11B 5/02
(52) U.S. Cl. .......................................... 360/66; 360/67
(58) Field of Search ............................ 360/66, 67, 16, 360/17, 31, 97.01

(56) References Cited

U.S. PATENT DOCUMENTS

| | | | | |
|---|---|---|---|---|
| 4,703,379 A | * | 10/1987 | Bogdanski | .................. 360/118 |
| 5,146,447 A | * | 9/1992 | Nagasato et al. | ........... 369/77.2 |
| 5,657,190 A | * | 8/1997 | Araki et al. | ................. 360/324 |
| 5,870,260 A | * | 2/1999 | Davies et al. | ................ 360/313 |
| 6,046,881 A | * | 4/2000 | Tielemans et al. | ........ 360/99.08 |
| 6,175,469 B1 | * | 1/2001 | Ahmad et al. | ........... 360/97.02 |

FOREIGN PATENT DOCUMENTS

| | | |
|---|---|---|
| JP | 07-029106 | 1/1995 |
| WO | WO98/49674 | 11/1998 |

* cited by examiner

*Primary Examiner*—Sinh Tran
*Assistant Examiner*—Glenda P. Rodriguez
(74) *Attorney, Agent, or Firm*—Bracewell & Giuliani LLP

(57) ABSTRACT

A magnetic circuit is provided in an enclosure that can efficiently generate magnetic flux from the enclosure, configuring a magnetic disk, to a magnetic disk. Thus, by providing such a magnetic circuit, a magnetic field different from that in other enclosure parts, that is, a local magnetic field, is generated from the magnetic circuit in case the disk device is set in an external magnetic field. Hence, this local magnetic field can effectively erase data in the magnetic disk. In particular, since the local magnetic field is generated even if the external magnetic field is weak, it is possible to not only suppress the demagnetization of permanent magnets used in the spindle motor at minimum, but also effectively erase data in the magnetic disk.

14 Claims, 6 Drawing Sheets

[Figure 2]
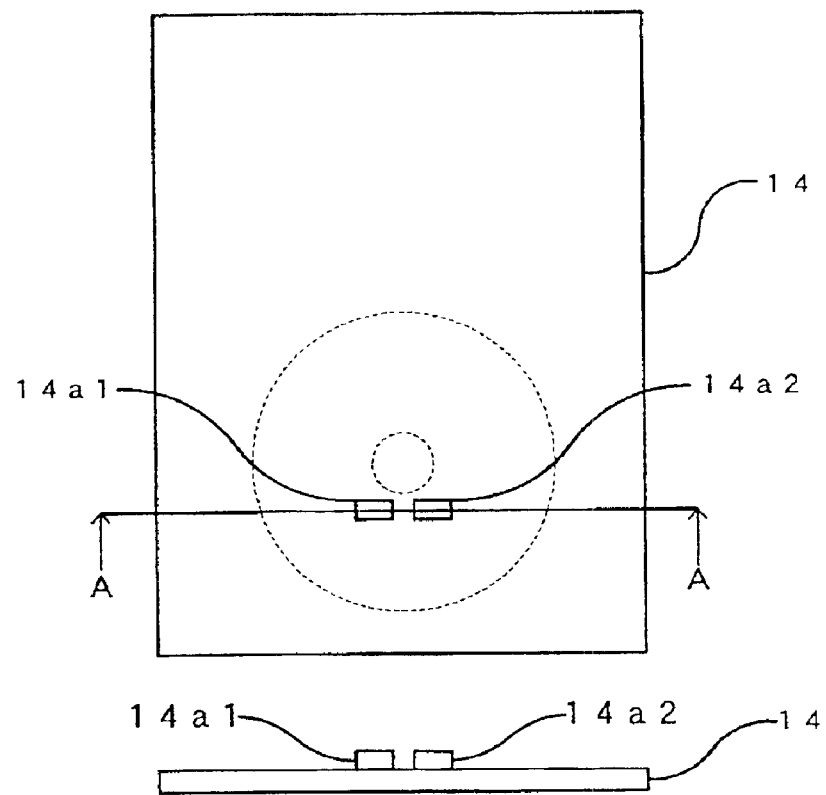
[Figure 3]
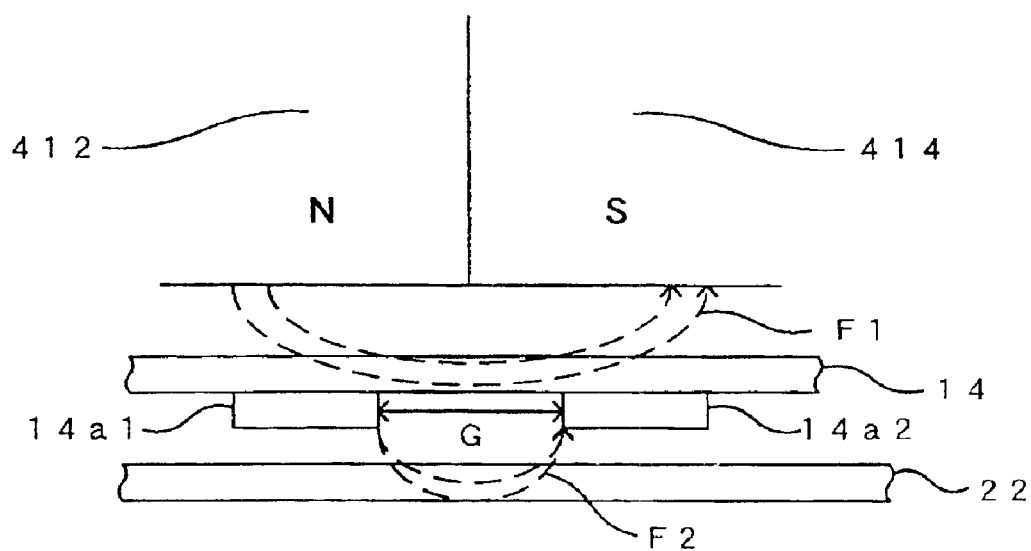

DISK DEVICE AND DATA-ERASING METHOD

BACKGROUND OF THE INVENTION

1. Technical Field

The present invention relates to a disk device having a structure suitable for erasing data stored in a magnetic disk in the disk device.

2. Description of the Related Art

A typical disk device includes a magnetic disk, a spindle motor for rotatably driving the magnetic disk, and a magnetic head for storing data into and reading data from the magnetic disk. The disk device also includes an enclosure called an enclosure case for containing the magnetic disk, spindle motor, magnetic head, and the like. The magnetic disk is formed with a data storage layer that is composed of a magnetic film on a substrate composed of non-magnetic material such as glass or Al and is formed by, for example, sputtering. Generally, the enclosure case is composed of a box-like base having an opening, and a plate-like top cover covering the opening of the base. Therefore, hermeticity is kept in the enclosure case.

As for the disk device, assembling is completed by covering the opening of the base with the top cover after assembling components such as the magnetic disk and the spindle motor in the base. After the completion of the assembling, servo data that is positional data and the like of the magnetic disk is written into the magnetic disk. The disk device where the servo data is completely written is provided for various tests for product shipping. Some disk devices may be qualified to be defectives in these tests. The disk devices qualified to be defectives are recycled by collecting parts not relating to the defectives after dismantling the disk devices. In case a magnetic disk is recycled, it is necessary to erase servo data already written so as to prevent the servo data from interfering with servo data to be written as a new product. In addition, in case writing itself of servo data is also qualified to be a defective, the erasing of the servo data becomes necessary. Furthermore, since test data is also written in the test for product shipping, in regard to disk devices qualified to be defectives, it is also necessary to erase the test data.

Regarding data erasing of a magnetic disk, Published Unexamined Patent Application No. 7-29106 proposes an effective method. What is described in the Published Unexamined Patent Application No. 7-29106 is to erase data stored in magnetic disks by inserting a rod, where permanent magnets are arranged, between rotating magnetic disks.

Although the method of the Published Unexamined Patent Application No. 7-29106 is effective, this method premises the insertion of the rod, where permanent is magnets are arranged, between rotating magnetic disks. Therefore, in such a state that the magnetic disk is mounted in the disk device, it is not possible to erase data in the magnetic disk. Although there is also a case that data of a magnetic disk is erased after removing the magnetic disk from a disk device, for example, in case of a writing failure of servo data, it is sufficient to erase the data in such a state that the magnetic disk is mounted in the disk device. The data erasing method in the Published Unexamined Patent Application No. 7-29106 cannot correspond to such a request.

A device, where data can be erased even in such a state that a magnetic disk is mounted in a disk device, is disclosed in International Publication WO98/49674. This device will be described on the basis of FIGS. 8 to 10.

As shown in FIG. 8, a data-erasing device 400 is composed of an upper magnet fixing part 402, a lower magnet fixing part 404, and a joint 406. The upper magnet fixing part 402 fixes permanent magnets 412 and 414, and the lower magnet fixing part 404 fixes permanent magnets 416 and 418. The permanent magnets 412 and 414 are adjacently arranged in such polarities that both attract each other. In addition, the permanent magnets 416 and 418 are also adjacently arranged in such polarities that both attract each other. Although the permanent magnets 412 and 416 face each other in a vertical direction, a facing surface of the permanent magnet 412 has a polarity different from that of a facing surface of the permanent magnet 416. In addition, although the permanent magnets 414 and 418 face each other in a vertical direction, a facing surface of the permanent magnet 414 has a polarity different from that of a facing surface of the permanent magnet 418.

FIG. 9 schematically shows a magnetic field generated by the data-erasing device 400 shown in FIG. 8. As shown in FIG. 9, it can be seen that a horizontal magnetic field is generated in an almost central part of the data-erasing device 400. In addition, since a horizontal magnetic recording system is adopted in a current magnetic disk, it is necessary to make a magnetic field, which is parallel to the magnetic disk, act on the magnetic disk so as to erase data stored in the magnetic disk. In addition, the strength of the magnetic field must be larger than a coercive force.

FIGS. 10A and 10B are schematic diagrams showing a method for erasing data stored in the magnetic disk 22 by using the data-erasing device 400. In addition, FIGS. 10A and 10B show each state of the top cover being removed so as to easily observe movement inside the disk device. First, the magnetic disk 22 is rotated. This rotation of the magnetic disk 22 is performed by driving a spindle motor provided in the disk device 10. Next, the disk device 10 is inserted into a gap between the upper magnet fixing part 402 and lower magnet fixing part 404 in the data-erasing device 400. At this time, in order that a magnetic field by the data-erasing device 400 does not affect this operation, a side where a head slider S is not present is inserted into a gap between the upper magnet fixing part 402 and lower magnet fixing part 404. Furthermore, the head slider S is evacuated as shown by each arrow in FIGS. 10A and 10B. If the rotation of the magnetic disk 22 is continued in this state, data erasing is performed by a parallel magnetic field acting on the entire surface of the magnetic disk 22.

In order to erase data stored in a magnetic disk, it is necessary to make a magnetic field, having strength equal to or larger than a coercive force of the magnetic disk, act on the magnetic disk. Recently, the recording density of a magnetic disk remarkably increases, and a coercive force of the magnetic disk also increases in connection with that. Therefore, in order to erase data stored in the magnetic disk, a magnetic field with the strength corresponding to that becomes necessary.

Although the data erasing of a magnetic disk may be performed in some cases by removing the magnetic disk from a disk device, the data erasing may be performed in other cases in the above-described state that the magnetic disk is contained in the disk device. The disk device has a spindle motor for rotating the magnetic disk, and permanent magnets are used in this spindle motor as components. The spindle motor is located at a center of rotation of the magnetic disk. Therefore, if a strong magnetic field for the data erasing of the magnetic disk is made to act on the spindle motor, the magnetic field reduces a magnetic force of the permanent magnets configuring the spindle motor. Hence the magnetic field becomes a cause of degrading characteristics of the spindle motor. Although it is good enough to make a stronger magnetic field act on the magnetic disk against the increase of the coercive force of the magnetic disk, this promotes the degradation of characteristics of the spindle motor.

Up to now, as for data erasing of a magnetic disk, improvement of a data-erasing device has been paid attention to. With changing a viewpoint, by adding improvements to a structure of a disk device, the present invention is intended to provide a disk device and a data erasing method that can not only suppress an action of a magnetic field on a spindle motor, but also effectively erase data stored in a magnetic disk.

SUMMARY OF THE INVENTION

The present invention provides a magnetic circuit in an enclosure that can efficiently fly magnetic flux from an enclosure, configuring a magnetic disk, to a magnetic disk. Thus, by providing such a magnetic circuit, a magnetic field different from that in other enclosure parts, that is, a local magnetic field is generated from the magnetic circuit in case the disk device is set in an external magnetic field. Hence, this local magnetic field can effectively function for erasing data in the magnetic disk. In particular, since the local magnetic field is generated even if the external magnetic field is weak, it is possible to not only suppress the demagnetization of permanent magnets used in the spindle motor at minimum, but also effectively erase data in the magnetic disk.

The present invention is devised on the basis of the above-described knowledge, and relates to a disk device characterized in including a magnetic disk for storing data, an enclosure for containing the magnetic disk, and a local magnetic field generator that is provided in the enclosure and generates a local magnetic field when being set in an external magnetic field. The local magnetic field generator of the present invention can be provided in such a case that the enclosure is composed of soft magnetic material and also in such a case that the enclosure is composed of non-magnetic material.

In the disk device of the present invention, the local magnetic field generated from the local magnetic field generator is generated from the enclosure toward the inside of the enclosure. Then, if the local magnetic field generator is provided on a side of the enclosure that faces the magnetic disk, the local magnetic field reaches the magnetic disk and effectively contributes to the erasing of data stored in the magnetic disk. In addition, it is desirable that a main component of the local magnetic field generated from the local magnetic field generator is a component parallel to the magnetic disk in an area where the magnetic disk is set. This is because a magnetic field parallel to the magnetic disk is necessary so as to erase data stored in the magnetic disk.

In order to generate a local magnetic field inside the enclosure of the disk device, it is good enough to provide pole pieces in the enclosure. Thus, the present invention provides the disk device characterized in including a disk-like storage medium that has a magnetic film formed on its surface, and an enclosure case that covers the disk-like storage medium and has pole pieces that can generate flux.

If this disk device is set in an external magnetic field, magnetic flux is generated with one of these pole pieces as an origin, and a magnetic field is formed. This magnetic flux with the pole pieces as the origin exhibits behavior different from the magnetic flux by the external magnetic field itself. If the pole pieces are provided on a surface that is an inner circumferential surface of the enclosure case and faces the magnetic disk, the magnetic flux generated from the pole pieces can reach farther than the magnetic flux by the external magnetic field. Thus, even if the magnetic flux by the external magnetic field may not reach the magnetic disk, the magnetic flux generated from the pole pieces can reach the magnetic disk, and hence the erasing of the data stored in the magnetic disk is performed. This shows that it is possible to make it possible to erase the data in the magnetic disk with suppressing the demagnetization of the permanent magnets configuring the spindle motor.

The pole pieces are composed of soft magnetic material. Furthermore, such a magnetic circuit that the magnetic flux generated from one pole piece returns to another pole piece. This magnetic circuit can be configured by providing a pair of protrusions, which are composed of soft magnetic material, on an enclosure configuring the disk device. Thus, the disk device of the present invention is characterized in including a magnetic disk for storing data, an enclosure for containing the magnetic disk, and a pair of protrusions that are provided on a surface of the enclosure that faces the magnetic disk, and are composed of soft magnetic material formed toward the magnetic disk. If this disk device is set in an external magnetic field, the pair of protrusions composed of soft magnetic material functions as pole pieces. Thus, the pair of protrusions configures such a magnetic circuit that flux leaked from one protrusion composed of soft magnetic material returns to another protrusion. A magnetic field by this magnetic circuit is a local magnetic field different from the external magnetic field itself.

A spindle motor of the disk device is located at a center of the magnetic disk since the spindle motor is used for rotating the magnetic disk. Therefore, permanent magnets that are components of the spindle motor are also present near the center of the magnetic disk. As described above, the permanent magnets of the spindle motor must not be demagnetized at the time of erasing data stored in the magnetic disk. Nevertheless, it is necessary to weaken a magnetic field affecting the disk device for data erasing so as to prevent the permanent magnets of the spindle motor from being demagnetized. In this case, data in an inner circumferential side of the magnetic disk is difficult to be erased. Therefore, in the disk device of the present invention, it is desirable to provide the pair of protrusions in a position facing the inner circumferential side of the magnetic disk.

An enclosure of a disk device is called an enclosure case. This enclosure case is composed of a box-like base having an opening, and a plate-like top cover covering the opening of the base. It is desirable to provide on the top cover a pair of protrusions of the present invention that is composed of soft magnetic material. This is because there is little space for providing the pair of protrusions of the present invention since it is necessary to mount various components of the disk device on the base. In addition, this is because this is disadvantageous in the case of the magnetic field being made to act since the distance between a surface of the base, facing the magnetic disk, and a surface of the magnetic disk is larger than a gap between a surface of the top cover, facing the magnetic disk, and the surface of the magnetic disk.

The pair of protrusions of the present invention is arranged with keeping a predetermined gap in a circumferential direction of the magnetic disk. In case data of the magnetic disk is erased by using the above-described data-erasing device 400, an external magnetic field that is parallel to the surface of the magnetic disk and is oriented in a tangential direction of the magnetic disk acts on the magnetic disk. In this case, if the pair of protrusions is arranged in a radial direction with keeping a predetermined gap, it is not possible to form the local magnetic field called in the present invention. If the pair of protrusions is arranged in a circumferential direction with keeping a predetermined gap, it is possible to form the local magnetic field effective for the data erasing. In addition, in the disk device of the present invention, it is good enough to provide only a pair of protrusions, and it is possible to provide a plural pair of protrusions. Furthermore, dimensions and shapes of the protrusions can be properly set according to dimensions and a number of sheets of the magnetic disks. Moreover, although the present invention does not limit the concrete quality of soft magnetic material constructing protrusions, it is desirable to use stainless steel such as SUS430 since corrosion resistance is also required as the disk device.

The present invention is characterized in that the present invention generates a local magnetic field from an enclosure of a disk device, and as one of examples, a pair of protrusions composed of soft magnetic material is shown. By the way, if a magnetic gap is present in soft magnetic material set in a magnetic field, leakage flux is generated from the gap. Therefore, it is also effective to generate leakage flux therefrom, that is, to form a local magnetic field by constructing the enclosure with the soft magnetic material and partially forming a magnetic gap. Hence, the present invention provides a disk device that is a disk device for storing and reading data and is characterized in that the disk device comprises a magnetic disk for storing data, and an enclosure for containing the magnetic disk, at least one of sides facing the magnetic disk is composed of soft magnetic material, and a magnetic gap is formed in the one side.

A typical example of the magnetic gap is a vacancy formed in a side of the enclosure that is composed of the soft magnetic material, and magnetic flux is leaked around this vacancy. It is further desirable to provide a magnetic circuit, used for orienting this leakage flux to the magnetic disk, in the vicinity of the vacancy.

If a vacancy that is a magnetic gap is provided in a top cover of an enclosure case, it is possible to form the top cover, composed of soft magnetic material, by stamping. At this time, it is possible to form the magnetic circuit in one piece, and hence this is advantageous on a manufacturing process. In addition, it is desirable to use stainless steel such as the above-described SUS430 as the soft magnetic material.

It is possible to sharpen a magnetic gradient of a magnetic field, formed by the pair of protrusions composed of soft magnetic material or the magnetic gap, more than that by an external magnetic field for data erasing. Therefore, the present invention provides a disk device characterized in that the disk device includes a disk-like storage medium that has on its surface a magnetic film having a predetermined coercive force and storing data, an enclosure case containing the disk-like storage medium, and a magnetic field generator that is provided on a side of the enclosure case facing the disk-like storage medium, and can form a magnetic field with a magnetic gradient steeper than that of the external magnetic field. Here, it is required that the magnetic field formed by the magnetic field generator is stronger than the coercive force of the magnetic disk so as to erase data in the magnetic disk.

It is also possible to solve the tasks of the present invention by a disk device that is a disk device for storing and reading data, and is characterized in that the disk device comprises a magnetic disk for storing data, and an enclosure for containing the magnetic disk, at least one of sides of the enclosure facing the magnetic disk is composed of soft magnetic material, and protrusions facing the magnetic disk are formed on the one side. In case this magnetic device is set in the external magnetic field, the leakage flux from the protrusions can reach a place farther than that of other parts. Therefore, if the protrusions are formed in an inner circumferential side of the magnetic disk that is difficult for data to be erased, it becomes possible to resolve the difficulty of data erasing.

If the data erasing by the above-described data-erasing device is performed for the disk device of the present invention, this is equivalent to executing the following new data erasing method. Thus, the data erasing method of the present invention is a method for erasing data stored in a magnetic disk in a disk device, and is characterized in comprising a step of generating an external magnetic field, a step of inserting the disk device into the external magnetic field, and a step of erasing data stored in the magnetic disk by generating a magnetic field with a magnetic gradient steeper than that of the external magnetic field.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 2 is a schematic diagram showing a top cover 14 used in the first embodiment;

FIG. 3 is a schematic diagram for explaining a magnetic field for erasing data in the first embodiment;

DETAILED DESCRIPTION OF THE PREFERRED EMBODIMENT

Figure 1:
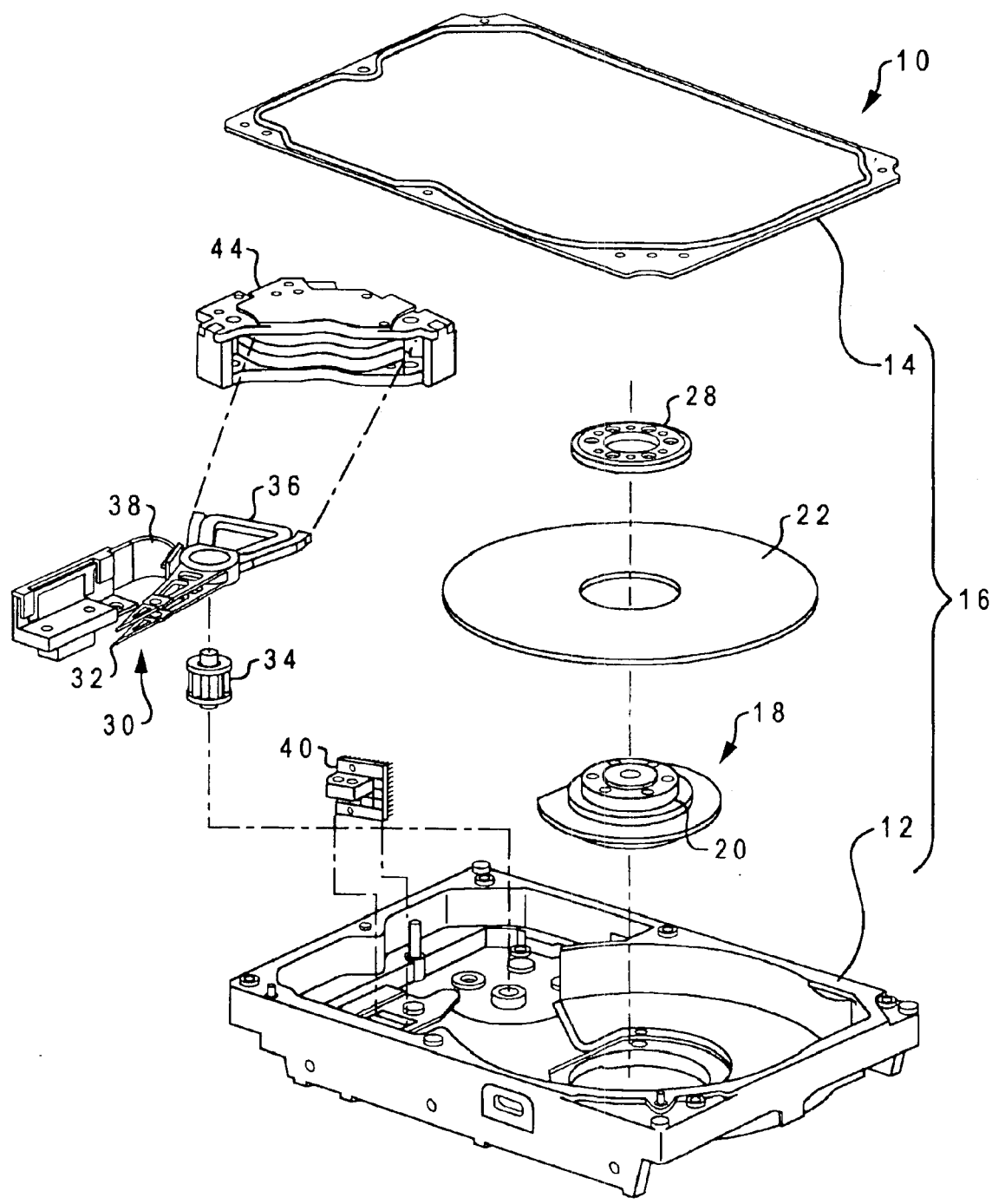
FIG. 1 is an exploded perspective view showing a disk device according to a first embodiment of the present invention.

Referring now to FIG. 1, in a disk device 10, an enclosure, that is, an enclosure case 16 is formed with an opening of a shallow-box-type base 12 made of aluminum alloy being covered by a top cover 14. This enclosure case 16 is formed in a shallow-square-box shape, and can be located horizontally in a computer or a keyboard. The top cover 14 made of SUS430 is screwed through a square frame-shaped sealing member (not shown) on the base 12, and hence the enclosure case 16 is hermetically sealed.

In this enclosure case 16, a spindle motor 18 with hub-in structure is provided at a central part of the base 12 that is a little to an end. A magnetic disk 22 composed of a glass substrate is fixedly mounted on an upper surface of a hub 20 of this spindle motor 18 with a top clamp 28, and is rotatably driven by the spindle motor 18. In this spindle motor 18, permanent magnets not shown are built in as components. The magnetic disk 22 is a disk-like storage medium for storing or reading data. Data storage is performed in a magnetic film (not shown) formed on a glass substrate.

In addition, in the enclosure case 16, an actuator 30 is provided. This actuator 30 has a magnetic head 32 in one end, its intermediate part is held on the base 12 through a pivot 34, and the actuator 30 is made to be freely rotatable around the pivot 34. In another end of the actuator 30, a VCM (Voice Coil Motor) coil 36 is provided, and the actuator 30 is rotated by a VCM 44 provided in the enclosure case 16 so as to collaborate with this VCM coil 36.

A card not shown is attached on an outer surface (a bottom surface) of the base 12 as a circuit substrate, and is made to be a rectangle having such dimensions that this card covers the outer surface of the base 12. Power for motor driving, signals, and the like are inputted and outputted between the card and above-described spindle motor 18, and power and signals for a motive force to the VCM coil 36 and reading of the magnetic head 32 are inputted and outputted between the card and actuator 30. These inputs/outputs between the card and actuator 30 are performed via a flexible cable (FPC) 38.

The disk device 10 of the present embodiment is a disk device called a head-load-unload type disk device. This head-load-unload type disk device unloads the magnetic head 32 to an evacuated position without contacting the magnetic head 30 to a surface of the magnetic disk 22 by making a ramp block 40 hold the actuator 30 at the time of being inoperative. At the time of being operative, the magnetic head 32 is positioned above the magnetic disk 22 by the actuator 30 driving the magnetic head 32.

FIG. 2 is a top view showing the outline of a side of the top cover 14 facing the magnetic disk 22 and shows a cross-sectional view taken on line A—A of this top view. As shown in FIG. 2, a pair of protrusions 14a1 and 14a2 is provided on a backside of the top cover 14. This pair of protrusions 14a1 and 14a2 is made of SUS430 similarly to the top cover 14. In addition, although a located position of the magnetic disk 22 in the top view of FIG. 2 is shown with dotted lines, it can be seen that the pair of protrusions 14a1 and 14a2 are arranged in an inner circumferential side of the magnetic disk 22. In addition, the pair of protrusions 14a1 and 14a2 is formed as a body different from the top cover 14 and is formed by bonding the pair of protrusions 14a1 and 14a2 in a predetermined position with an adhesive. Nevertheless, it can be formed with the top cover in one piece.

In this embodiment, in order to erase data stored in the magnetic disk 22, for example, servo data that is positional information of the magnetic disk 22, it is possible to use the data-erasing device 400 already described with reference to FIGS. 8 to 10. FIG. 3 is a schematic diagram for explaining a magnetic field formed when the disk device 10 is inserted into the data erasing device 400 as demonstrated in FIG. 10B. Since the permanent magnets 412 and 414 of the data erasing device 400 have polarities shown in FIG. 3, magnetic flux F1 leaking from the permanent magnet 412 forms a loop of returning to the permanent magnet 414. A magnetic field formed by this leakage flux F1 becomes an external magnetic field for the disk device 10 that is an object for data erasing. Thus, FIG. 3 is a cross-sectional view showing a magnetic action when the disk device 10 is set in the external magnetic field.

Since the top cover 14 of the disk device 10 is made of SUS430 that is soft magnetic material, as shown in FIG. 3, the leakage flux F1 passes through the top cover 14 where magnetic flux can pass more easily than a space. Nevertheless, since SUS430 does not belong to a class of high flux density, magnetic flux from the permanent magnets 412 and 414 leaks from the top cover 14 if magnetic characteristics of the permanent magnets 412 and 414 are high. Nevertheless, description of this leakage flux is omitted in FIG. 3.

The pair of protrusions 14a1 and 14a2 is as follows. Thus, the pair of protrusions 14a1 and 14a2 functions as pole pieces by being magnetized by an external magnetic field. Therefore, as shown in FIG. 3, magnetic flux F2 is generated from the protrusion 14a1 to the protrusion 14a2. In addition, as for the magnetic flux F2, only a typical magnetic flux is shown. This magnetic flux F2 forms a local magnetic field for parts where the pair of protrusions 14a1 and 14a2 is not provided. Properties of this magnetic flux F2 are affected by a gap G between the pair of protrusions 14a1 and 14a2. In order to fly the magnetic flux F2 farther, it is necessary to widen the gap G. Nevertheless, in this case, a magnetic gradient of a magnetic field generated by the magnetic flux F2 becomes gentle. On the contrary, if the gap G is narrow, the magnetic gradient of the magnetic field generated by the magnetic flux F2 becomes steep. Thus, this means that, if the gap G is narrow, field strength becomes low as the distance increases in comparison with a case that the gap G is wide. In the present invention, there is such a requirement that, although we want to make a strong magnetic field act on the magnetic disk 22, in particular, its inner circumferential side, we do not want to make a magnetic field act on the permanent magnets that are components of the spindle motor 18. Since the magnetic disk 22 is near the permanent magnets of the spindle motor 18, it is desirable that the magnetic field that is made to act on the magnetic disk 22 is steep. Therefore, if the pair of protrusions 14a1 and 14a2 is provided, it is desirable to determine the gap G in consideration of these points. Nevertheless, if the magnetic field formed by the pair of protrusions 14a1 and 14a2 has a magnetic gradient comparable to that of the external magnetic field, the provision of the pair of protrusions 14a1 and 14a2 is not so advantageous. Therefore, the magnetic gradient of the magnetic field formed by the pair of protrusions 14a1 and 14a2 must be steeper than that of the external magnetic field. In addition, in the magnetic field formed by the pair of protrusions 14a1 and 14a2, a component parallel to a surface of the magnetic disk 22 is made to be a main part in a region including the magnetic disk 22. This is because, as described above, it is necessary to make the magnetic field parallel to the surface of the magnetic disk 22 act on the magnetic disk 22 so as to erase data stored in the magnetic disk 22. Furthermore, it is necessary that the strength of the magnetic field that is made to act on the magnetic disk 22, as described above, is equal to or stronger than a coercive force of a magnetic film formed on the magnetic disk 22.

According to the above-described first embodiment of the present invention, a pair of protrusions 14a1 and 14a2 made of the soft magnetic material functions as pole pieces when the disk device 10 is positioned in an external magnetic field, and can form a magnetic field, which is local and has a steep magnetic gradient, for the magnetic disk 22. Therefore, even if the strength of the external magnetic field is weakened, it is possible to efficiently converge the magnetic flux for the magnetic disk 22. Owing to this, it is possible to erase data with suppressing the demagnetization of the permanent magnets of the spindle motor 18.

In addition, although the top cover 14 is made of SUS430 that is soft magnetic material, the first embodiment functions even if the top cover 14 is non-magnetic material. Furthermore, although the pair of protrusions 14a1 and 14a2 composed of soft magnetic material is provided on the top cover 14, this can be also provided on the base 12, or can be also provided on both of the top cover 14 and base 12. Moreover, although the pair of protrusions 14a1 and 14a2 is provided in a position facing the inner circumferential side of the magnetic disk 22, this can be also provided in another position. Thus, the first embodiment hereinabove is an embodiment desirable for implementing the present invention, but the first embodiment is never a ground of limiting the present invention.

Figure 4:
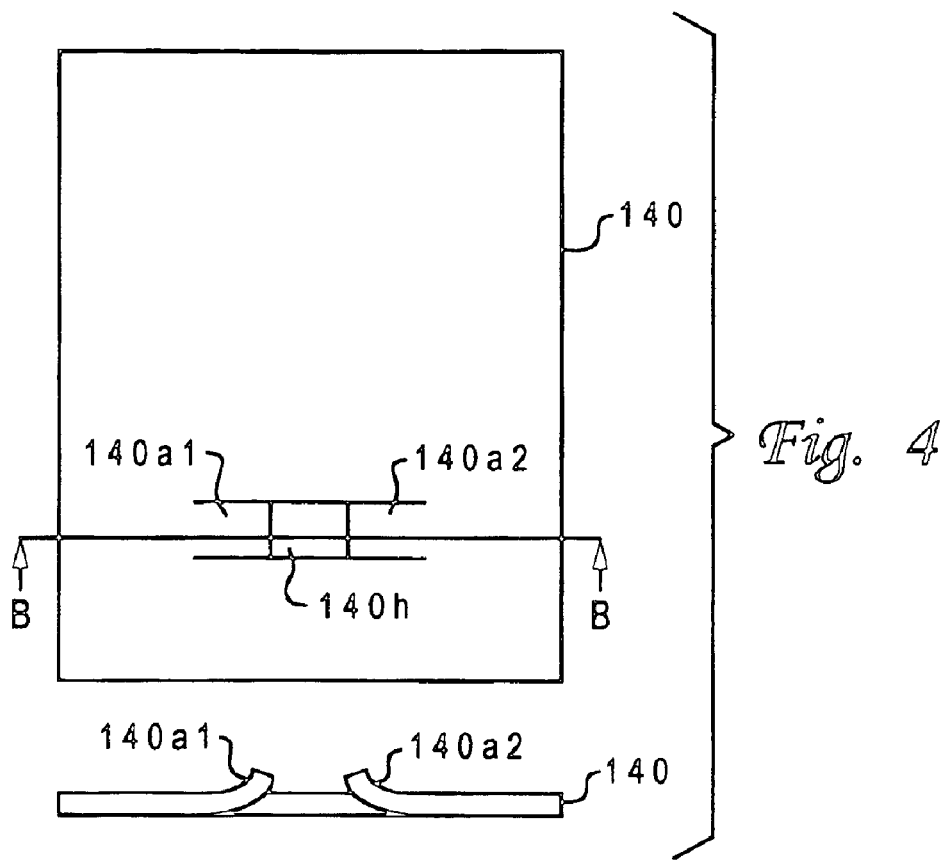
FIG. 4 is a schematic diagram showing a top cover 140 used in a second embodiment.
Figure 5:
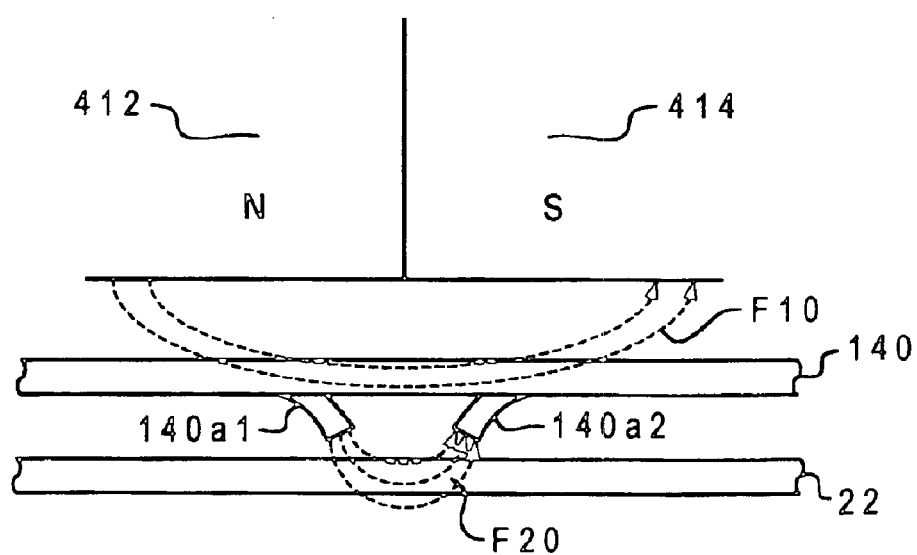
FIG. 5 is a schematic diagram for explaining a magnetic field for erasing data in the second embodiment.

A second embodiment of the present invention is shown in FIGS. 4 and 5. A fundamental configuration of a disk device 10 in the second embodiment is similar to that in the first embodiment except such a point that a form of a top cover 140 is different. Therefore, here, the top cover 140 will be mainly described.

FIG. 4 is a top view showing the outline of a side (backside) of the top cover 140 facing the magnetic disk 22 and shows a cross-sectional view taken on line B—B of this top view. As shown in FIG. 4, a pair of protrusions 140a1 and 140a2 is provided on a backside of the top cover 140. This pair of protrusions 140a1 and 140a2 is formed in one piece in the top cover 140. Since this top cover 140 is made of SUS430, the pair of protrusions 140a1 and 140a2 is made of soft magnetic material. The pair of protrusions 140a1 and 140a2 is formed with facing the magnetic disk 22, and a vacancy 140h is provided between the pair of protrusions 140a1 and 140a2. This vacancy 140h becomes a magnetic gap in the top cover 140 that is soft magnetic material. Therefore, if the top cover 140 is set in a magnetic field, magnetic flux leaks from the vacancy 140h to the outside. The second embodiment is intended to use the magnetic field, formed by this leakage flux, for data erasing. Nevertheless, in order to efficiently fly the magnetic flux to a necessary position of the magnetic disk 22, the pair of protrusions 140a1 and 140a2 is provided.

The second embodiment premises that the top cover 140 is composed of soft magnetic material, and is characterized in that the pair of protrusions 140a1 and 140a2 is formed with the top cover 140 in one piece. Plenty of conventional top covers are formed by press-forming. The top cover 140 of the second embodiment can be also formed by press-forming by using a predetermined dies that can form the pair of protrusions 140a1 and 140a2 and the vacancy 140h. This has such an advantage that manufacturing is easy in comparison with a case that, as the first embodiment, the pair of protrusions 140a1 and 140a2 is formed as a separate piece and is bonded at predetermined position with an adhesive.

In the second embodiment, so as to erase data stored in the magnetic disk 22, for example, servo data that is positional information of the magnetic disk 22, it is possible to use the data erasing device 400, which has been already described with reference to FIGS. 8 to 10, similarly to the first embodiment. FIG. 5 is a schematic diagram for explaining a magnetic field formed when the disk device 10 is inserted into the data erasing device 400 as shown in FIG. 10B. Since the permanent magnets 412 and 414 of the data erasing device 400 have polarities shown in FIG. 5, magnetic flux F10 leaking from the permanent magnet 412 forms a loop of returning to the permanent magnet 414. A magnetic field formed by this leakage flux F10 becomes an external magnetic field for the disk device 10 that is an object for data erasing.

As shown in FIG. 5, magnetic flux F20 leaks from the protrusion 140a1 of the top cover 140 exposed in the external magnetic field. This magnetic flux F20 passes through the magnetic disk 22 and returns to the protrusion 140a2. Thus, the pair of protrusions 140a1 and 140a2 constructs a magnetic circuit generating the magnetic flux F20 toward the magnetic disk 22 around the vacancy 140h. It can be said that a magnetic field formed by the magnetic flux F20 is also a magnetic field, being locally constructed, in comparison with other parts of the top cover 140. In addition, so as to reduce demagnetizing action to the permanent magnets of the spindle motor 18, it is desirable to set a gap between the protrusions 140a1 and 140a2 so that its magnetic gradient becomes steeper than that of the external magnetic field.

Although the top cover 140 is composed of SUS430 in the second embodiment, the present invention is not limited to this, but it is possible to gain effects of the present invention even if the top cover 140 is composed of any soft magnetic material. Nevertheless, if poor corrosion resistance material such as pure iron is used, it becomes necessary to perform corrosion treatment such as Ni plating so as to secure the corrosion resistance. Therefore, it is desirable to use soft magnetic material having the corrosion resistance like SUS430 used in the second embodiment.

In addition, in the second embodiment, the leakage flux F20 is generated by forming the vacancy 140h in the top cover 140. It is desirable to seal this vacancy 140h by bonding sheet material made of non-magnetic material on the top cover 140.

This is for securing hermeticity inside the enclosure case 16. A filler made of non-magnetic material can be also filled in the vacancy 140h instead of bonding the sheet material. In this case also, it goes without saying that the vacancy 140h is a magnetic gap.

Figure 6:
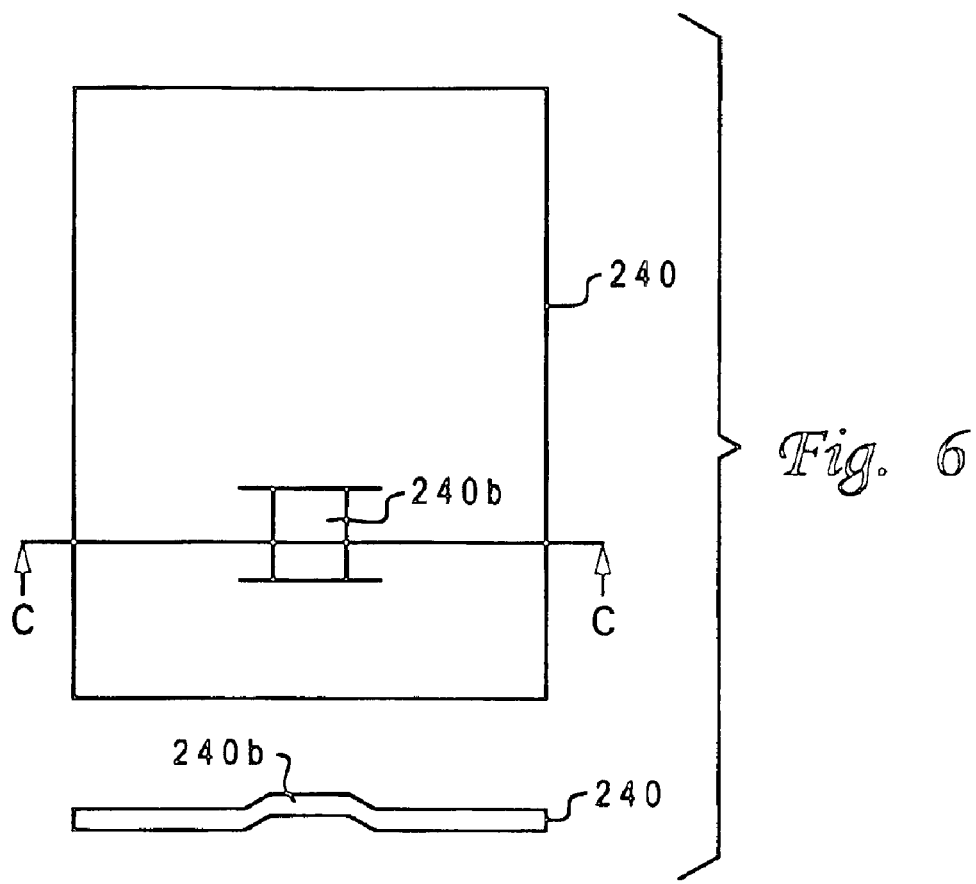
FIG. 6 is a schematic diagram showing a top cover 240 used in a third embodiment.
Figure 7:
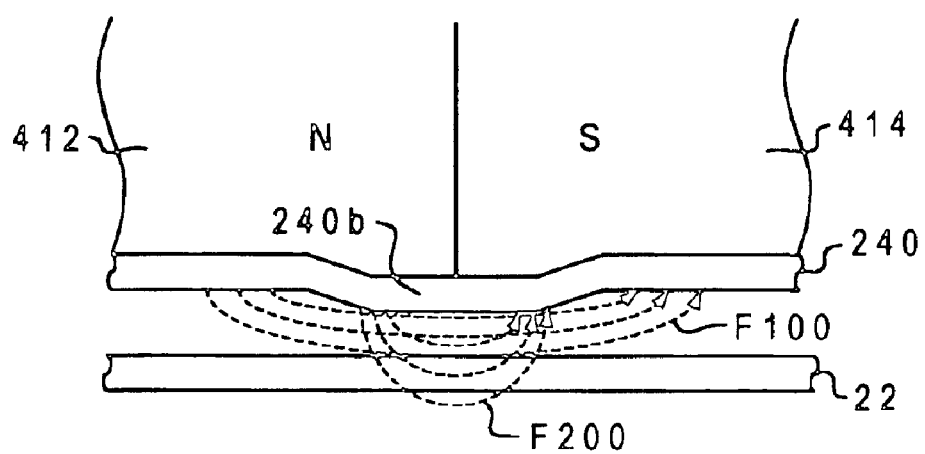
FIG. 7 is a schematic diagram for explaining a magnetic field for erasing data in the third embodiment.

A third embodiment of the present invention is illustrated in FIGS. 6 and 7. In addition, a disk device 10 of the third embodiment has the configuration similar to that in the first embodiment except a different form of a top cover 240. Therefore, here, the top cover 240 will be mainly described.

FIG. 6 is a top view showing the outline of a side (backside) of the top cover 240 facing the magnetic disk 22 and shows a cross-sectional view taken on line C—C of this top view. As shown in FIG. 6, a convex portion 240b is provided on a backside of the top cover 240. This convex portion 240b is formed in one piece with the top cover 240 made of SUS430. The backside of the convex portion 240b is concave. The top cover 240 having the convex portion 240b can be obtained by press-forming by using a predetermined dies similarly to that in the second embodiment.

Figure 8:
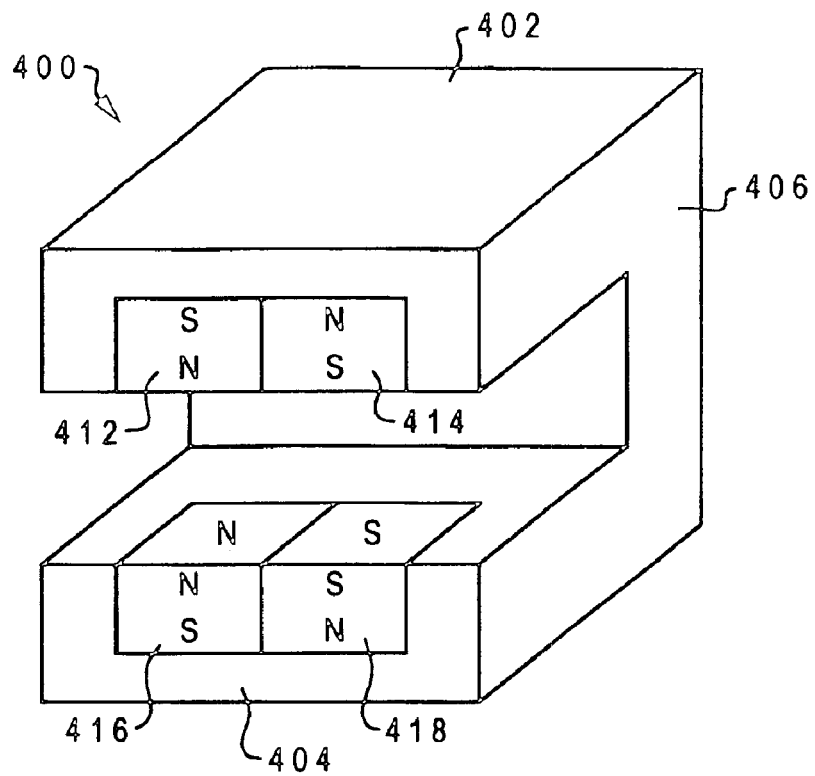
FIG. 8 is a schematic diagram showing a prior art data-erasing device disclosed in International Publication WO98/49674.
Figure 9:
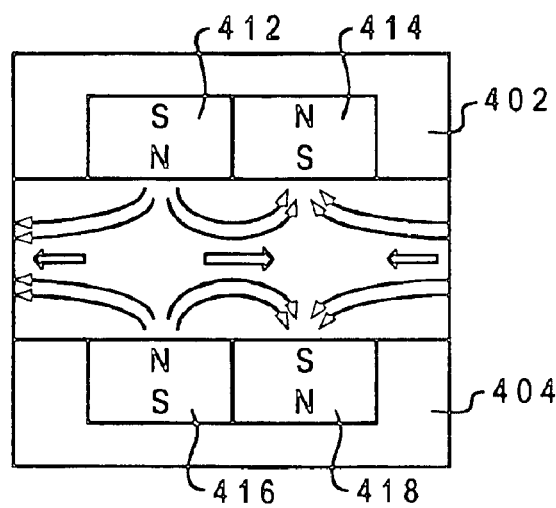
FIG. 9 is a schematic diagram for explaining a magnetic field generated by the prior art data erasing device disclosed in International Publication WO98/49674.
Figure 10:
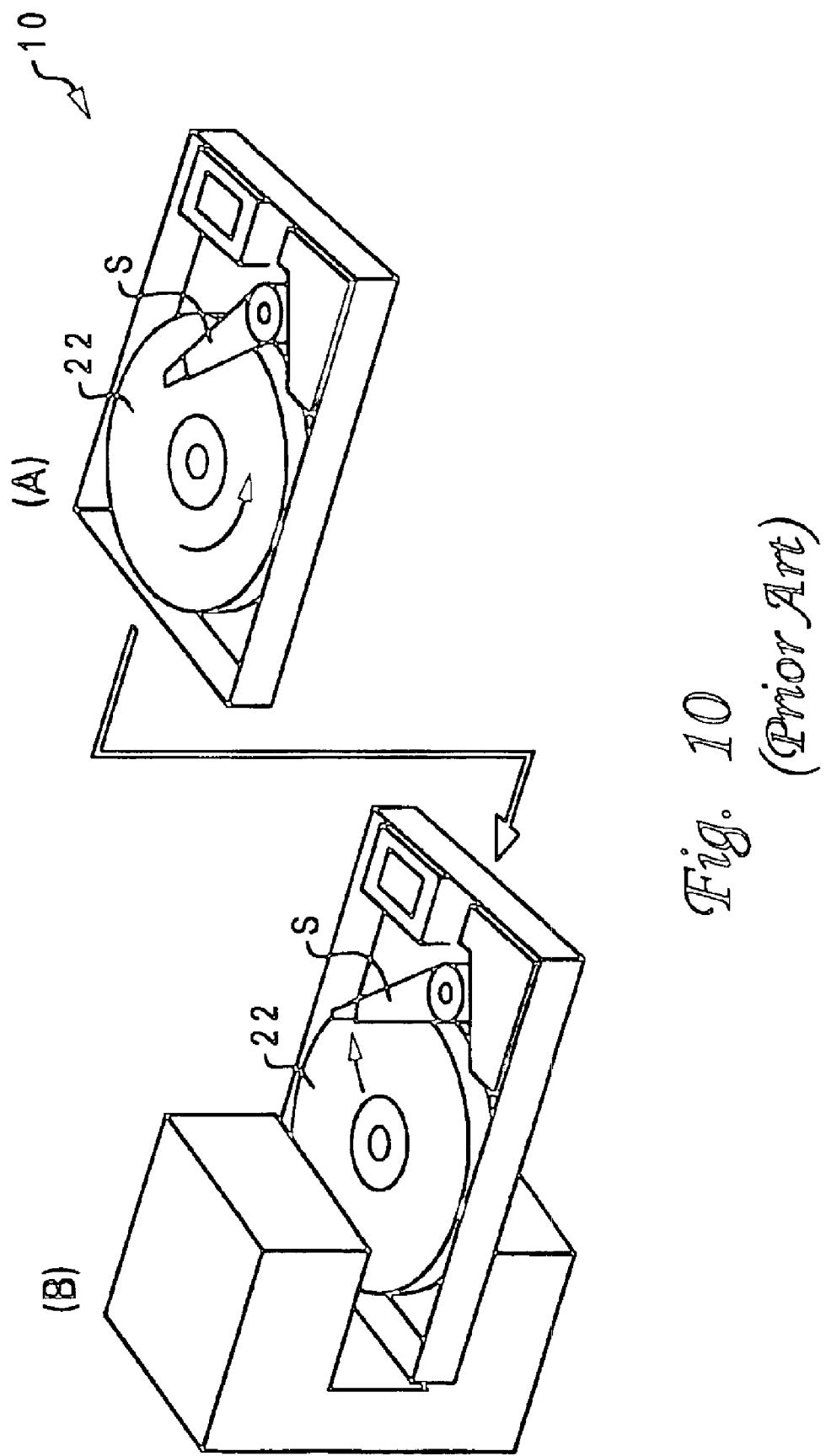
FIGS. 10A and 10B are schematic diagrams for explaining a data erasing method by using the prior art data-erasing device disclosed in International Publication WO98/49674.

In the third embodiment, so as to erase data stored in the magnetic disk 22, for example, servo data that is positional information of the magnetic disk 22, it is possible to use the data erasing device 400, which has been already described on the basis of FIGS. 8 to 10, similarly to the first embodiment. FIG. 7 is a schematic diagram for explaining a magnetic field formed when the disk device 10 is inserted into the data erasing device 400 as shown in FIG. 10B. In the third embodiment, the permanent magnets 412 and 414 of the data erasing device 400 have each part having a shape corresponding to the concave portion in the backside of the convex portion 240b in the top cover 240.

Since the permanent magnets 412 and 414 of the data erasing device 400 have polarities shown in FIG. 7, magnetic flux F100 leaking from the permanent magnet 412 forms a loop of fundamentally returning to the permanent magnet 414. Nevertheless, magnetic flux F200 leaking from the convex portion 240b is different from the magnetic flux F100 leaking from the other part. Thus, magnetic flux F200 leaking from the convex portion 240b can reach places farther than the magnetic flux F100 leaking from the other part. In addition, a magnetic field formed by the magnetic flux F200 is local and has a steep magnetic gradient against a magnetic field formed by the leakage flux F100 from the other part. By this magnetic field acting on the magnetic disk 22, it is possible to erase data stored in the magnetic disk 22.

The present invention has advantages over the prior art. As described above, according to a disk device of the present invention, it is possible to effectively erase data in a magnetic disk with suppressing an action of a magnetic field to a spindle motor.

What is claimed is:

1. A disk device, comprising:
    a magnetic disk for storing data and having a radial surface;
    an enclosure for containing the magnetic disk and having a surface; and
    a local magnetic field generator provided in the enclosure for generating a local magnetic field when the enclosure is set in an external magnetic field; and wherein
    the local magnetic field generator extends from the surface of the enclosure and extends axially toward the radial surface of the magnetic disk such that the local magnetic field generator is axially closer to the magnetic disk than the surface of the enclosure, and the local magnetic field is generated from the enclosure toward the magnetic disk.

2. The disk device according to claim 1, wherein the local magnetic field has a main component parallel to a surface of the magnetic disk in an area where the magnetic disk is located.

3. A disk device, comprising:
    a magnetic disk for storing data having a radial surface;
    an actuator having a magnetic head for reading data from and writing data to the magnetic disk;
    an enclosure containing and surrounding the magnetic disk and the actuator and having a surface that is substantially parallel to the radial surface of the magnetic disk; and
    a pair of protrusions mounted to and extending axially from the surface of the enclosure facing the magnetic disk such that the protrusions are axially closer to the magnetic disk than the surface of the enclosure, wherein the protrusions are radially spaced apart from each other and composed of soft magnetic material formed toward the magnetic disk and are spaced apart from the magnetic head.

4. The disk device according to claim 3, wherein the pair of protrusions is provided in a position corresponding to an inner circumference side of the magnetic disk.

5. The disk device according to claim 3, wherein the enclosure includes a box-like base having an opening part, and a top cover for covering the opening part of the base, and the pair of protrusions is provided on the top cover.

6. The disk device according to claim 3, wherein the pair of protrusions is located in a circumferential direction of the magnetic disk while maintaining a predetermined gap therebetween.

7. A disk device for storing and reading data, comprising:
    a magnetic disk for storing data and having a radial surface;
    an actuator having a magnetic head for reading data from and writing data to the magnetic disk;
    an enclosure for containing the magnetic disk and the actuator, wherein at least one surface of the enclosure facing the magnetic disk is parallel to the radial surface of the magnetic disk and composed of soft magnetic material; and
    a magnetic gap formed on said at least one surface of the enclosure between a pair of generally rectangular, radially spaced-apart protrusions that extend axially away from said at least one surface of the enclosure, wherein the pair of protrusions are discontinuous with the magnetic bead of the actuator and axially closer to the radial surface of the magnetic disk than said at least one surface.

8. The disk device according to claim 7, wherein the magnetic gap is a vacancy formed in the enclosure composed of the soft magnetic material.

9. The disk device according to claim 8, wherein a magnetic circuit generating magnetic flux toward the magnetic disk is formed around the vacancy.

10. The disk device according to claim 9, wherein the magnetic circuit is integrally formed with the enclosure as a single piece.

11. A disk device, comprising:
    a disk-like storage medium having a radial surface with a magnetic film having a predetermined coercive force;
    an enclosure case containing the disk-like storage medium and having a top cover; and
    a magnetic field generator protruding from a surface of the top cover and facing toward the radial surface of the disk-like storage medium for forming a magnetic field with a magnetic gradient that is steeper than that of an external magnetic field when the enclosure case is set in the external magnetic field; and wherein
    the magnetic field generator comprises a pair of protrusions that are bent from the surface of the to cover axially toward the radial surface of the disk-like storage medium, such that the pair of protrusions are axially closer to the radial surface than the surface of the top cover.

12. The disk device according to claim 11, wherein intensity of the magnetic field formed by the magnetic field generator is stronger than the predetermined coercive force of the disk-like storage medium.

13. A system for erasing data in a disk device for storing and reading data, comprising:
    a magnetic disk having radial surface for storing data;
    an actuator having a magnetic head for reading data from and writing data to the magnetic disk;
    an enclosure for containing the magnetic disk and the actuator, the enclosure having top cover with a radial surface facing the radial surface of the magnetic disk that is substantially parallel to the radial surface of the magnetic disk and is composed of soft magnetic material;

an external magnet located outside an exterior surface of the enclosure; and a convex portion facing the magnetic disk is formed on said radial surface of the top cover and is discontinuous with respect to the magnetic head on the actuator, the convex portion being located axially closer to the magnetic disk than the top cover of the enclosure;

leakage flux from the convex portion due to the external magnet arrives farther than leakage flux from another part of said at least one surface when the disk device is set in an external magnetic field generated by the external magnet; and the convex portion comprises an indentation having inclined segments that are formed at acute angles with respect to the radial surface of the to cover, and a planar offset segment that is parallel to the radial surfaces of the top cover and the magnetic disk.

14. A data-erasing method for erasing data stored in a magnetic disk in a disk device, comprising the steps of:

providing a disk device with a magnetic disk located inside an enclosure;

providing both the magnetic disk and the enclosure with radial surfaces that are substantially parallel to each other;

positioning a protrusion on the radial surface of the enclosure, such that the protrusion is axially closer to the radial surface of the disk than the radial surface of the enclosure;

providing the protrusion with two segments that are radially spaced apart from each other;

generating an external magnetic field on an exterior of the enclosure such that the external magnetic field at least partially penetrates the enclosure;

inserting the disk device into the external magnetic field; and erasing data stored in the magnetic disk by generating an internal magnetic field with a magnetic gradient that is steeper than that of the external magnetic field inside the disk device with the segments of the protrusion that are mounted to the radial surface of the enclosure.

* * * * *

UNITED STATES PATENT AND TRADEMARK OFFICE
CERTIFICATE OF CORRECTION

PATENT NO. : 6,900,956 B2
DATED : May 31, 2005
INVENTOR(S) : Hiroki Kitahori et al.

It is certified that error appears in the above-identified patent and that said Letters Patent is hereby corrected as shown below:

Column 11,
Line 30, please add -- an axis of rotation, an outer perimeter, and -- after the word "having".
Line 31, please add -- extending therebetween; -- after the word "surface".
Line 36, please add -- the local magnetic field generator located exclusively radially inboard of the outer perimeter of the magnetic disk between the outer perimeter and the axis of the magnetic disk; -- after the word "field".
Line 49, please add -- an axis of rotation, an outer perimeter, and -- after the word "having".
Line 49, please add -- extending therebetween; -- after the word "surface".
Line 55, please remove the word "and" after the semicolon at the end of the sentence.
Line 63, please remove the period after the word "head" and add -- ; and -- at the end of the sentence. Directly after this, add a new paragraph -- the protrusions being located exclusively radially inboard of the outer perimeter of the magnetic disk between the outer perimeter and the axis of the magnetic disk. --.

Column 12,
Line 10, after the word "having" insert -- an axis of rotation, an outer perimeter, and --.
Line 11, after the word "surface", insert -- extending therebetween; --.
Line 26, remove the period after the word "surface" and insert -- ; and --. Directly after this, insert a new paragraph -- the pair of protrusions being located exclusively radially inboard of the outer perimeter of the magnetic disk between the outer perimeter and the axis of the magnetic disk --.
Lines 37 and 59, after the word "having", insert -- an axis of rotation and --.

UNITED STATES PATENT AND TRADEMARK OFFICE
CERTIFICATE OF CORRECTION

PATENT NO. : 6,900,956 B2
DATED : May 31, 2005
INVENTOR(S) : Hiroki Kitahori et al.

It is certified that error appears in the above-identified patent and that said Letters Patent is hereby corrected as shown below:

Column 13,
Line 20, after the word "disk" insert -- having an axis of rotation and an outer perimeter, and being --.

Column 14,
Line 5, after the word "enclosure" insert -- exclusively between the axis and the outer perimeter of the magnetic disk, --.

Signed and Sealed this

Thirtieth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,900,956 B2
DATED : May 31, 2005
INVENTOR(S) : Hiroki Kitahori et al.

It is certified that error appears in the above-identified patent and that said Letters Patent is hereby corrected as shown below:

Column 11,
Line 30, please add -- an axis of rotation, an outer perimeter, and -- after the word "having".
Line 31, please add -- extending therebetween; -- after the word "surface".
Line 36, please add -- the local magnetic field generator being located exclusively radially inboard of the outer perimeter of the magnetic disk between the outer perimeter and the axis of the magnetic disk; -- after the word "field".
Line 49, please add -- an axis of rotation, an outer perimeter, and -- after the word "having".
Line 49, please add -- extending therebetween; -- after the word "surface".
Line 55, please remove the word "and" after the semicolon at the end of the sentence.
Line 63, please remove the period after the word "head" and add -- ; and -- at the end of the sentence. Directly after this, add a new paragraph -- the protrusions being located exclusively radially inboard of the outer perimeter of the magnetic disk between the outer perimeter and the axis of the magnetic disk. --.

Column 12,
Line 10, after the word "having" insert -- an axis of rotation, an outer perimeter, and --.
Line 11, after the word "surface", insert -- extending therebetween; --.
Line 26, remove the period after the word "surface" and insert -- ; and --. Directly after this, insert a new paragraph -- the pair of protrusions being located exclusively radially inboard of the outer perimeter of the magnetic disk between the outer perimeter and the axis of the magnetic disk --.
Lines 37 and 59, after the word "having", insert -- an axis of rotation and --.

UNITED STATES PATENT AND TRADEMARK OFFICE
CERTIFICATE OF CORRECTION

PATENT NO. : 6,900,956 B2
DATED : May 31, 2005
INVENTOR(S) : Hiroki Kitahori et al.

It is certified that error appears in the above-identified patent and that said Letters Patent is hereby corrected as shown below:

Column 13,
Line 20, after the word "disk" insert -- having an axis of rotation and an outer perimeter, and being --.

Column 14,
Line 5, after the word "enclosure" insert -- exclusively between the axis and the outer perimeter of the magnetic disk, --.

This certificate supersedes Certificate of Correction issued August 30, 2005.

Signed and Sealed this

Seventh Day of February, 2006

JON W. DUDAS
*Director of the United States Patent and Trademark Office*